United States Patent [19]

Miguel

[11] 4,302,141

[45] Nov. 24, 1981

[54] BALE DESTACKER

[76] Inventor: Marvin E. Miguel, P.O. Box 404, Armona, Calif. 93202

[21] Appl. No.: 53,401

[22] Filed: Jun. 29, 1979

[51] Int. Cl.³ .................... B65G 59/02; B65G 47/24
[52] U.S. Cl. .................................. 414/119; 193/47; 198/382; 198/410; 198/411; 198/416; 414/124
[58] Field of Search ............... 414/114, 117, 118, 119, 414/124, 781; 193/44, 47; 198/400, 406, 410, 382, 411, 416; 187/26

[56] References Cited

U.S. PATENT DOCUMENTS

| | | | |
|---|---|---|---|
| 2,370,325 | 2/1945 | Ranney | 193/47 X |
| 2,499,499 | 3/1950 | Hedburg | 193/47 |
| 2,944,702 | 7/1960 | Fenton | 414/119 X |
| 3,146,870 | 9/1966 | Schuricht | 193/44 |
| 3,593,824 | 7/1971 | Gregory | 187/26 |
| 3,666,066 | 5/1972 | Coakes | 193/47 |
| 4,056,187 | 11/1977 | Ajero | 198/400 X |

FOREIGN PATENT DOCUMENTS

| | | | |
|---|---|---|---|
| 2134472 | 1/1973 | Fed. Rep. of Germany | 193/47 |
| 1013806 | 12/1965 | United Kingdom | 414/127 |

*Primary Examiner*—James L. Rowland
*Attorney, Agent, or Firm*—Huebner & Worrel

[57] ABSTRACT

Disclosed is a mechanism for receiving bales or cartons in small stacks or cubes and delivering single bales or cartons in pre-determined alignment. The bale or carton is placed on an elevator floor and moved up in steps of one tier at a time. A pusher arm sweeps the top tier of bales or cartons off of the stack into a tier container. The tier container has drag chains which move the bales or cartons laterally into an orienting chute where each is oriented to the same pre-determined position regardless of its position in the stack. Two such units may be combined with a common chute so that two different stacks of bales or cartons may be alternatively singulated.

15 Claims, 17 Drawing Figures

FIG. 17

BALE DESTACKER

BACKGROUND OF INVENTION

This invention relates generally to devices for handling hay bales and cartons, and more specifically to apparatus for breaking down stacks of bales or cartons and feeding them singularly and alternatively to other handling apparatus.

In recent years, the art of handling hay bales and cartons has become increasingly mechanized. Numerous devices now exist for picking up hay bales in the field and forming them into convenient sized stacks which are tied together by the bales being in different position orientation. These convenient sized stacks, generally called cubes, are then moved about with forklift type trucks equipped with the squeeze arms. The cubes are loaded and unloaded on highway trailers and are themselves stacked together to make large haystacks for storage. Large hay users such as dairies, cattle feed lots, and pellet mills typically inventory their hay in stacks.

Efforts to mechanize the feeding of hay from such bale stacks has also made progress. Machines have been developed to de-bale hay bale by breaking off the wires and breaking or chopping the bale for easy use of feeding. No truly effective devices have yet been developed, however, for breaking the bale cubes down into single bales oriented in such a way that they can be conveniently fed to the de-baler. This work is still largely done by hand.

Since it is sometimes desirable to mix or intersperse bales of different kinds of hay, mechanization of the destacking operation is further complicated. Cartons are also assembled into stacks, frequently on pallets, so they can be readily handled in packing houses and factories. Again effective mechanization is not yet available for breaking down a carton stack into a line of single commonly oriented units.

It is, therefore, a major object of my invention to provide an apparatus for breaking down a stack of bales or cartons into single units all oriented in like positions regardless of their orientation in the stack.

It is also an important object of my invention to provide a destacker of the type described which will operate on cubes of hay bales formed by nearly all commonly used bale stackers.

It is a further object of my invention to provide a destacker of the type described in which the final orientation of the bales or cartons is achieved by a gravity chute, thereby minimizing the power requirement.

It is still another object of my invention to provide a destacker of the type described which operates with sufficient speed to produce a continuous run of single like-oriented articles.

It is yet another object of my invention to provide a destacker of the type described which can be paired with a like unit and a common orienting chute whereby bales from the second unit may be destacked and interspersed with bales from the first unit.

It is still a further object of my invention to provide a destacker of the type described which is of rugged construction and substantially maintenance free.

DESCRIPTION OF THE DRAWINGS

These and other objects and advantages of my invention will become more readily apparent from the following detailed description of a preferred embodiment when read together with the accompanying drawings in which.

Figure 1:
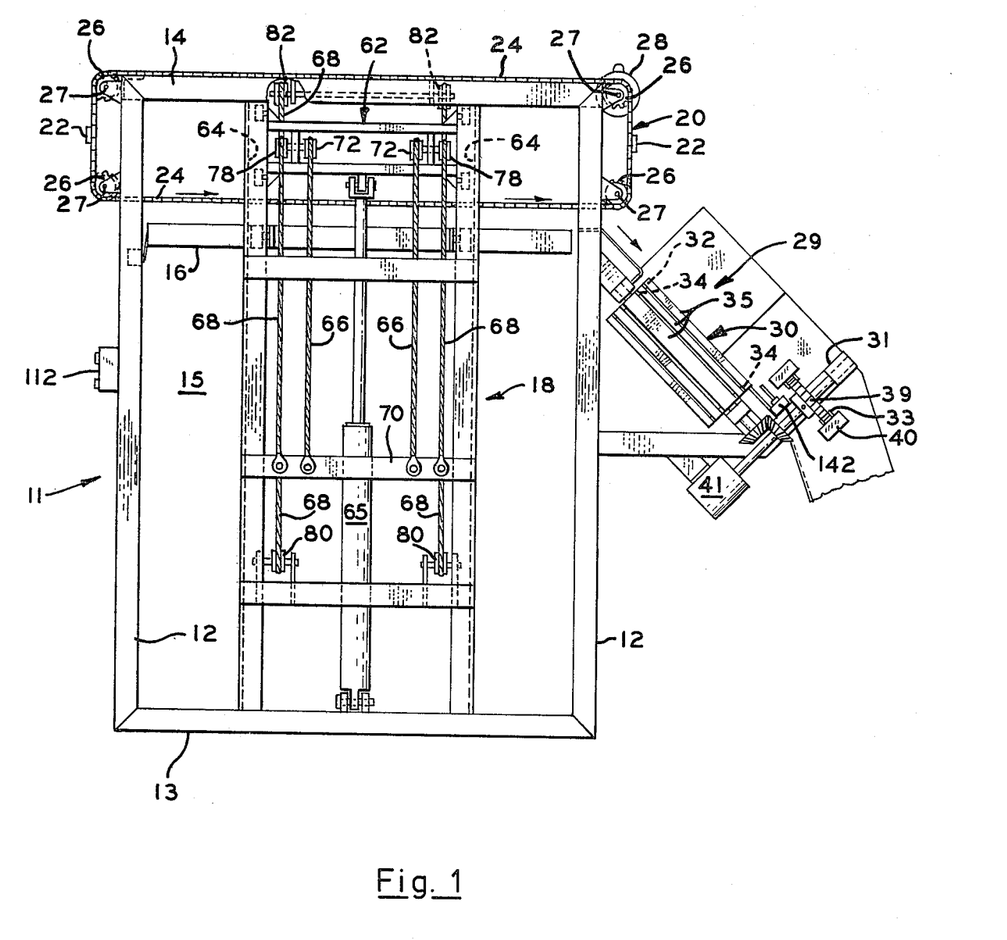
FIG. 1 is a side elevational view of a preferred embodiment of my invention.
Figure 2:
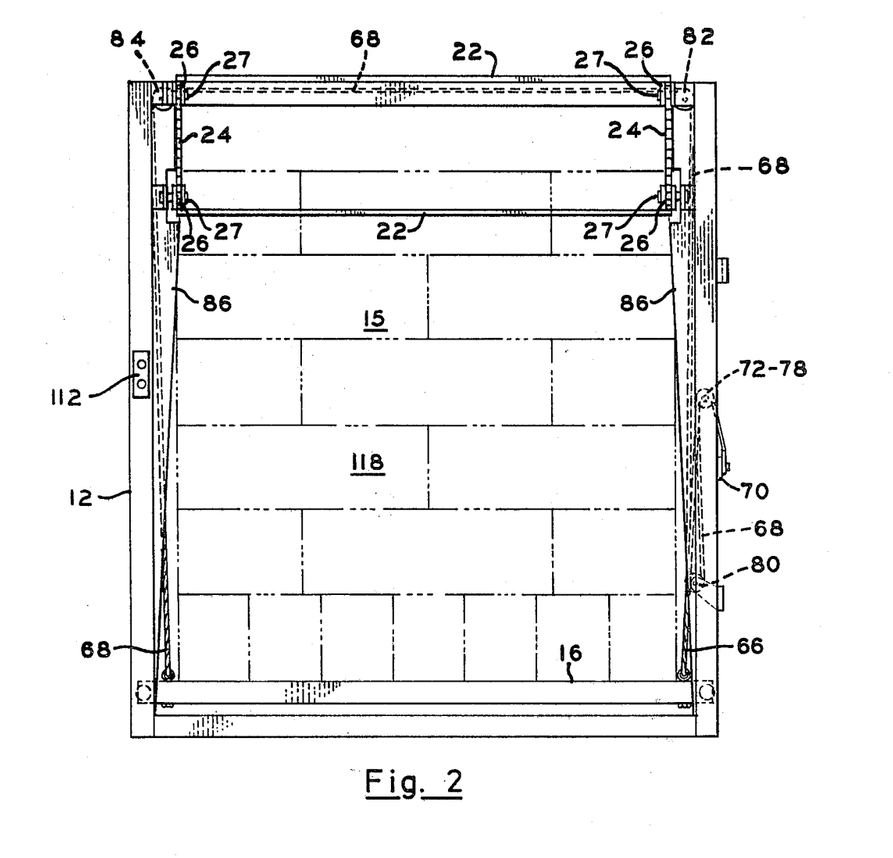
FIG. 2 is an end elevational view of the preferred embodiment of FIG. 1.

Referring now to the drawings, and particularly FIG. 1 and 2 thereof, the numeral 10 designates generally a preferred embodiment of my destacker. Although my preferred embodiment is directed to the destacking of a cube of hay bales, the application of my invention to cartons will be obvious as well.

The hay bale destacker 10 has a frame structure 11 which is generally rectangular and has four corner support posts 12, a base 13 and a top 14. The four support posts 12 define a chamber 15 in which is mounted an elevator 16 that travels vertically in the chamber 15 by means of a lift 18. A tier pusher 20 is mounted in the top portion of the destacker 10 and moves across the top of the chamber 15 to push the top tier of bales from a stack of bales positioned on the elevator 16.

The tier pusher 20 has a pair of paddles 22 mounted on a pair of drag chains 24 which travel on sprockets 26 in the top 14 of the destacker.

The sprockets 26 are mounted in pairs on sprocket axles 27 which are interconnected by drive chains and driven in common by a drive motor 28. When the drive motor is activated the drag chains 24 draw the paddles 22 through the upper portion of the chamber 15 in a fore and aft direction and then up over the top 14 of the frame structure. The paddles 22 are equally spaced apart so that while one paddle is passing through the upper portion of the chamber 15 and forcing any tier of bales located therein out of the chamber, the other is passing over the top 14 on a return trip to the start position. Thus, whenever the tier pusher drive motor 28 is activated, one of the paddles 22 is always in position to force a tier of bales out of chamber 15.

A transfer compartment 29 is mounted on one end of the frame structure 11 and positioned to receive bales pushed off a bale stack by the tier pusher 20. The transfer compartment 29 has a back or support wall 30 and a support floor 31 joined at right angles and tilted to form a trough at about 45 degrees off vertical. The back wall extends downwardly and outwardly from the top portion of the chamber 15 at the point of exit of bales therefrom a distance greater than the length of the bales to a distal edge. The support wall is joined with the distal edge and extends generally upwardly therefrom. A backwall drag chain 32 is mounted on the back wall 30 and a floor drag chain 33 is mounted in the floor of the transfer compartment 29. These move bales disposed in the transfer compartment laterally to one end of the trough.

The backwall drag chain 32 has a pair of sprockets 34 mounted on shafts at each end of the trough upon which it revolves and a number of slats 35 which are connected between a pair of chain runs 36 to grip the adjacent surface of bales disposed in the trough. The floor drag chain 33 has a single chain run 38 which runs on single sprockets 39 and has upstanding bale engaging cleats 40. The back wall drag chains 32 and floor drag chain 33 are driven in unison by a hydraulic transfer compartment conveyor motor 41, through drive shafts. An orienting chute 42 is connected to the discharge end 43 of the compartment 29 and has an upper portion 44 with orienting gate structure 45 and a lower portion 46 which constitutes a discharge ramp for the gravity discharge of single bales, (See FIGS. 3-5).

The orienting gate structure 45 has a down step 47 at its junction with the transfer compartment 29 and has a height slightly greater than half the width of the narrower side 48, of the bale. A bale which exits from the discharge end 43 of the transfer compartment 29 with its narrower side 48 disposed on the back wall 30 tips upon reaching the step and flops over onto its wider side 49 as it enters the orienting gate structure 45 (See FIG. 5). The flopover occurs because the lead edge of the narrower side 48 of the bale does not contact the floor 50 of the orienting chute 42 until the bale has tipped past its center point. To contain the bale during flopover, the orienting chute 42 has a retainer wall or first upper deflecting wall 51 spaced from the step 47 a distance slightly greater than the wide side 49 of the bales.

Figure 4:
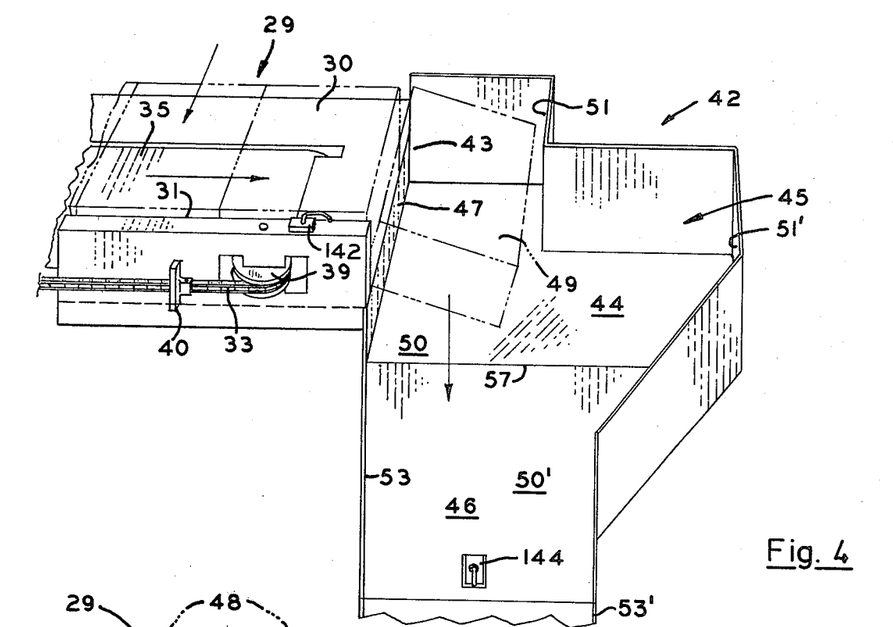
FIG. 4 is a partial perspective view showing the orienting chutes handling of bales in a second condition.
Figure 5:
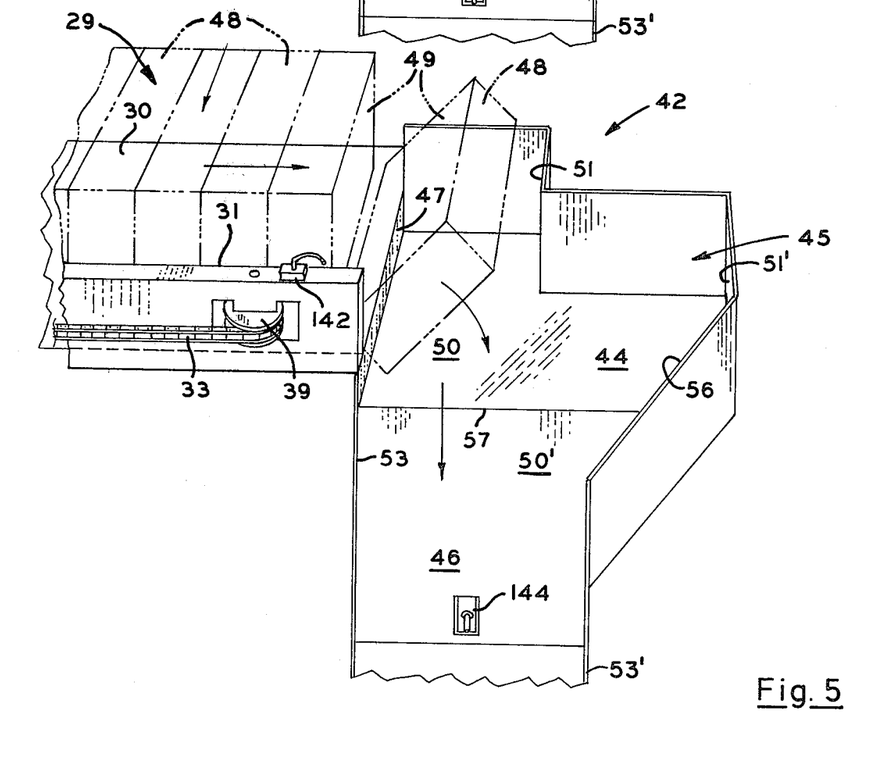
FIG. 5 is a partial perspective view showing the orienting chute handling of bales in a third condition.

When the bales are discharged from the transfer compartment 29 into the orienting chute 42 with their wider sides 49 contacting the back wall 30, they tip off the step 47 but their lead edge strikes the floor 50 before the bale passes its center point and no flopover occurs (See FIG. 4). Again, the bale is retained in proper alignment in the orienting chute 42 by the retainer wall 51.

When bales are delivered from the transfer compartment 29 to the orienting chute 42 with their wider sides 49 contacting the back wall 30 but in an endwise condition (See FIG. 3), they must be rotated ninety degrees on their wider side so they proceed down the chute in the same orientation as the bales previously described, that is, on their wide sides 49 but in end to end relationship. To accomplish this an upstanding turn edge 52 is formed by joining a guide wall or first lower deflecting wall 53 of the lower portion of the chute with the transfer compartment floor 31 at the discharge end 43 of the transfer compartment. The turn edge 52 is generally aligned with the step 47. A turn space 54 is formed by providing a second upper deflecting wall 51', which extends generally vertically upwardly from the floor 50 and which is disposed in spaced, generally parallel relation to the step at a distance greater than the length of the bales, where bales delivered endwise are received from the step 47. A diagonal guide surface or third lower deflecting wall 56 is directed inwardly on a slant from the wall 51'. A second lower deflecting wall 53' is provided at the lower portion of the chute, parallel to the guide wall 53 and extending downwardly from the guide surface 56. The walls 53 and 53' and extending downwardly from the guide surface 56 are spaced apart a distance slightly greater than the wide side 49 of the bale.

Figure 3:
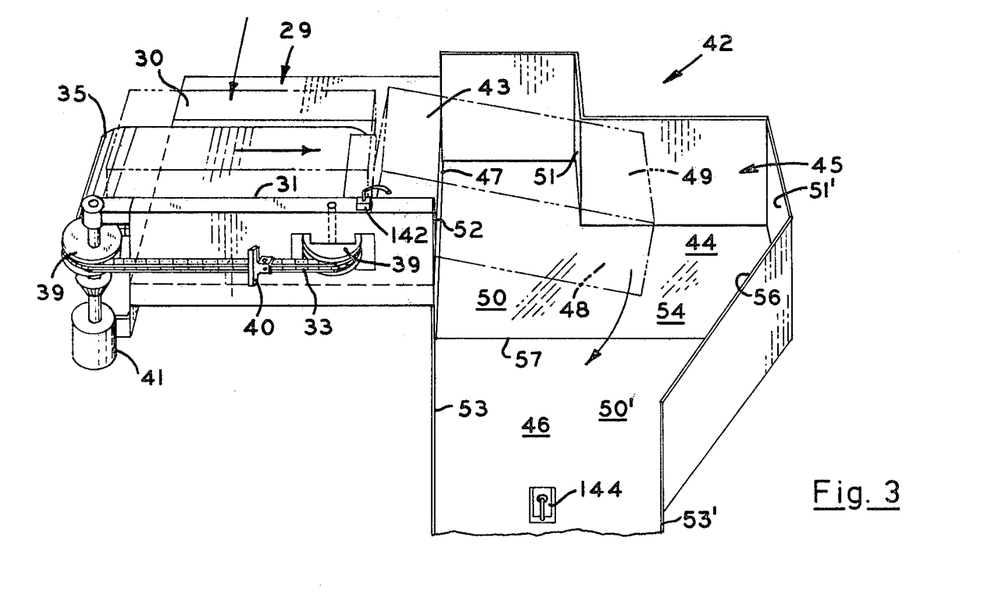
FIG. 3 is a partial perspective view showing the orienting chute handling of bales or cartons in one condition.

It should be recognized that bales may be discharged from the transfer compartment 29 into the orienting chute 42 in still another position, that is, in end to end alignment as in FIG. 3 but with their narrow sides 48 resting on the back wall 30. In such a case the bales tip over the down step 47 and pivot about the turn edge 52 until the rear portion of the narrow side 48 approaches alignment with the down step. At this point the bales flop over onto their wide side 49 on the orienting chute floor 50 and pass to the lower portion of the chute in the same position as other bales.

The floor 50' in the lower portion 46 of the orienting chute 42 slants downwardly with a substantially greater slope than the floor 50 in the upper portion 44 and a transverse or tip edge 57 extended laterally of the chute is thereby defined at their junction. The transverse edge 57 is generally aligned with the floor 31 of the transfer compartment and encourages bales to slide faster on the lower portion after they have been reoriented in the upper portion.

When an endwise bale on its wide side 49 passes from the discharge end of the transfer compartment 29 its leading end protrudes into the turn space 54 until more than half of the bale length extends into the orienting chute beyond the step 47 and the turn edge 52. At this point, gravity draws the bale wide side 49 downward toward the floor 50 and the narrower side 48 downward toward the lower portion 46 of the chute. The bale is thus simultaneously pivoted about the step 47 and the turn edge 52 until it flops into the orienting chute 42 wide side down and end to end with the chute. The bale then passes the transverse edge 57 and accelerates down the chute in the same orientation as the other bales described.

Thus, each bale delivered to the orienting chute 42 passes out of the lower portion of the chute longitudinally oriented on its wide side regardless of how the bale enters the chute.

It is apparent from the foregoing description that the lower portion 46, which constitutes a discharge ramp, is interconnected with the floor 50 at points along the edge 57 and extends in an alignment normal to the direction of travel of bales received in the orienting gate structure 45 and that this lower portion is disposed to discharge bales from this floor. It is also apparent that the bales are received in the transfer compartment 29 in groups individually corresponding to the tiers of bales from the chamber 15 and the bales of each group are separated from one another as they pass downwardly over the wall 30 into contact with the floor 50.

To operate the elevator 16 I provide a trolley 62 which travels in a pair of vertical tracks 64 and is driven by a hydraulic elevator ram 65.

As best shown in FIGS. 1 and 2, the elevator 16 is connected to the trolley 62 by two pairs of cables, near side cables 66 and far side cables 68. The near side cables 66 each have one end anchored to a cross bar 70 on the frame structure 12 and pass upwardly over the inside sheaves 72 on a pair of laterally spaced sheave axles on the trolley 62. The near side cables 66 then pass downwardly and have their other ends connected to the side of the elevator near the trolley 62. The far side cables 68 each have one end anchored to cross bar 70 also and pass upwardly over a pair of outside sheaves 78 on the trolley 62, downwardly about a pair of track sheaves 80, mounted one on each of the trolley tracks, and then upwardly again over a pair of near side top sheaves 82 in the top 14 of the frame structure 12. From the top sheaves 82 the far side cables 68 then pass across the top 14 over a pair of far side top sheaves 84 and downwardly therefrom where their other ends connect to the elevator 16 on the far side (See FIG. 2).

With the near side cables 66 and far side cables 68 thus connected, it will be apparent that when the trolley 62 is moved upwardly in the trolley tracks by the elevator ram, the length of the cable portions passing between cross bar 70 and the trolley sheaves will be increased at the rate of twice the actual travel of the trolley, and will draw up the elevator 16 at twice the rate of the trolley movement. Likewise, when the trolley moves downwardly in its tracks, the length of the cable portions passing between cross bar 70 and the trolley sheaves will be reduced at twice the rate of the trolley movement and the elevator will be lowered at twice the rate of the trolley movement, because the slack is fed to the ends of the cables attached to the elevator.

The support posts 12 of the frame structure have guides 86 which taper inwardly and upwardly to provide a funnel shape to the chamber 15 and compact the bale stack as it is moved upwardly in the chamber. Side walls (not shown) are provided on the frame structure to prevent bales from tumbling out during operation.

DRIVE AND CONTROL SYSTEM

Figure 6:
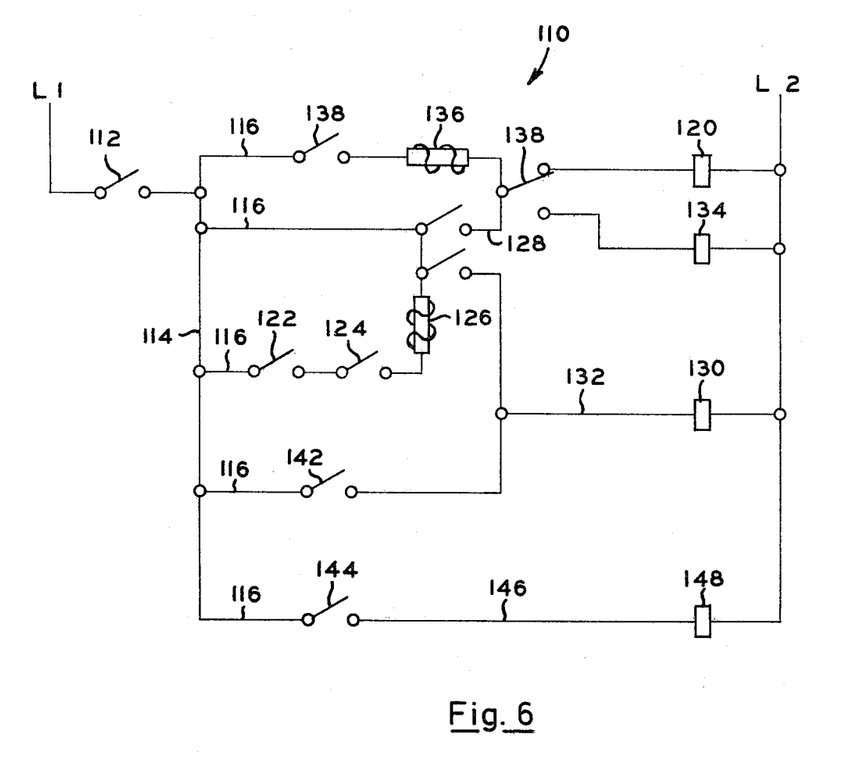
FIG. 6 is a schematic view of the control circuit for my preferred embodiment.
Figure 7:
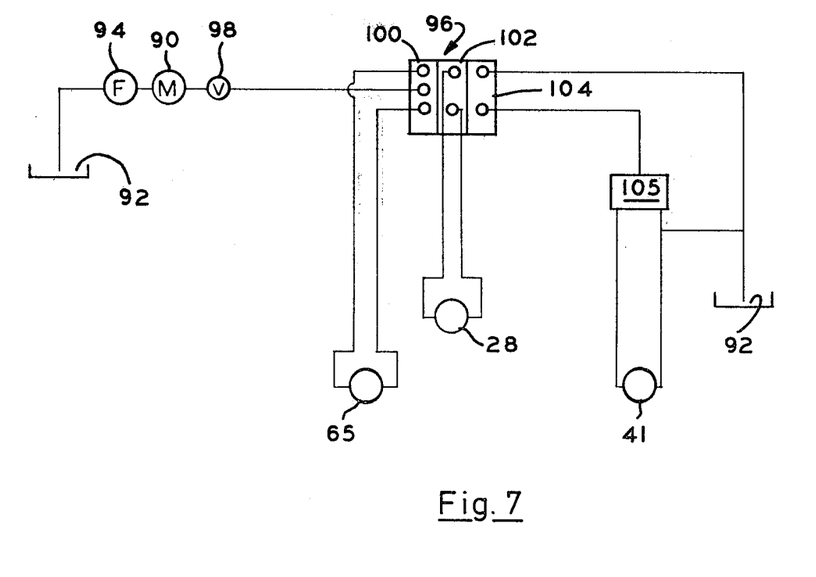
FIG. 7 is a schematic view of the drive circuit of my preferred embodiment.
Figure 8:
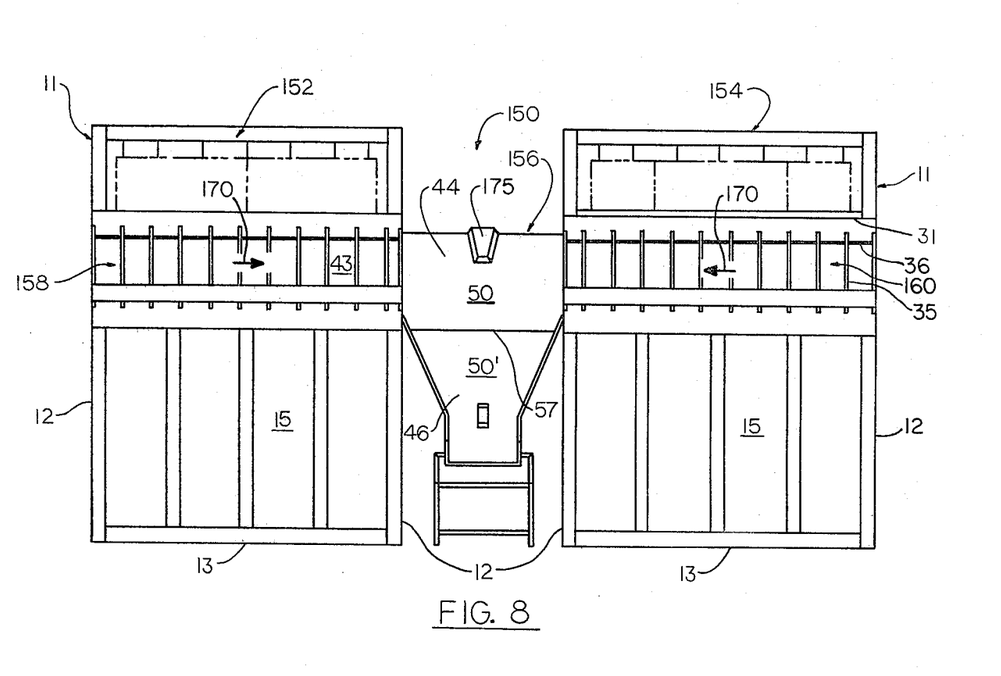
FIG. 8 is a front elevational view of an alternate form of my preferred embodiment in which two destacking units are paired with a common chute.
Figure 9:
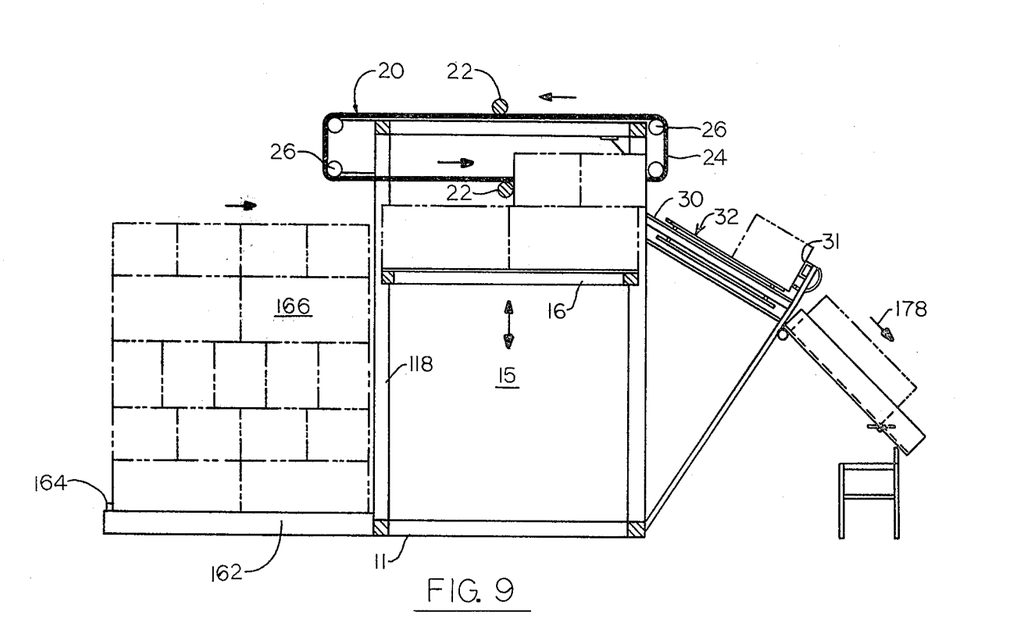
FIG. 9 is a side elevational view of the alternate preferred embodiment of FIG. 8, showing a bale stack.
Figure 10:
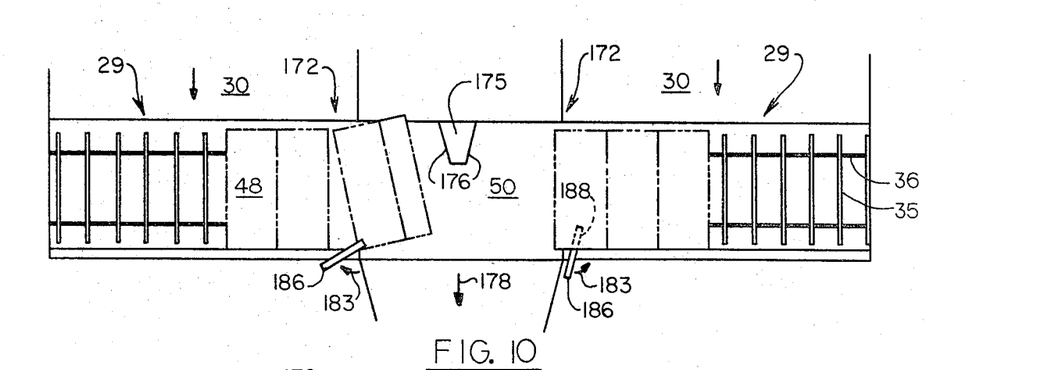
FIG. 10 is a partial plan view of the alternate preferred embodiment showing the bale delivery and orienting portion with the bales from each unit in a first condition.
Figure 11:
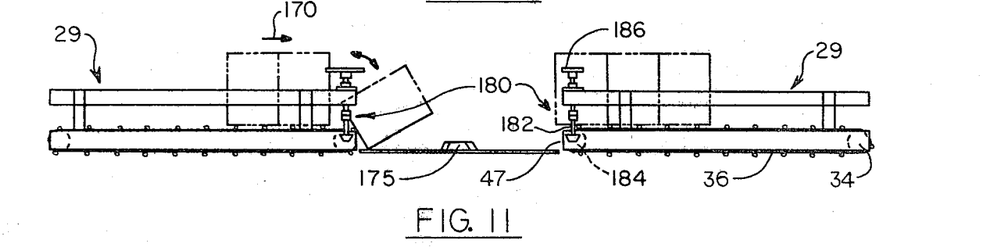
FIG. 11 is a front elevational view of the bale delivery and orienting portion with the bales oriented as shown in FIG. 10.
Figure 12:
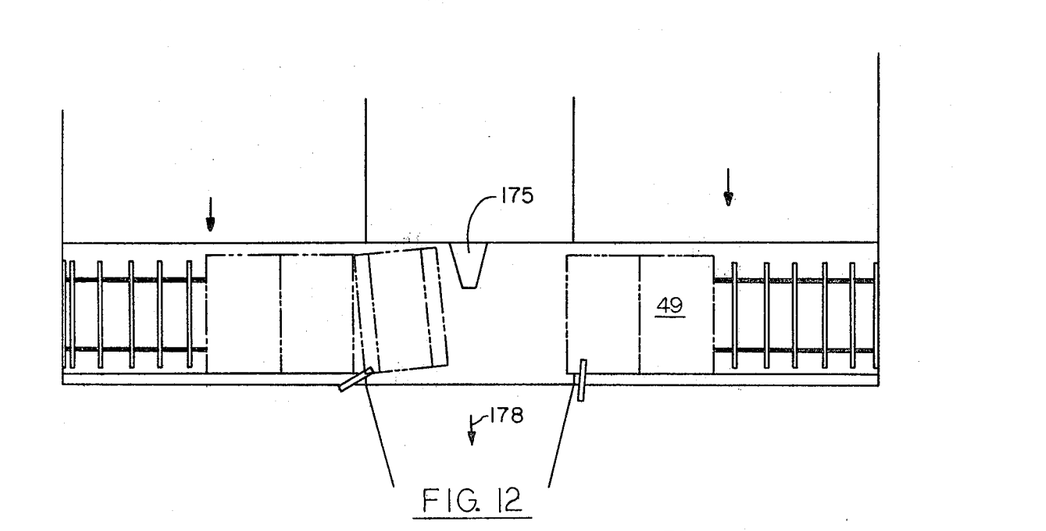
FIG. 12 is a partial plan view of the alternate preferred embodiment showing the bale delivery and orienting portion with the bales in a second condition.
Figure 13:
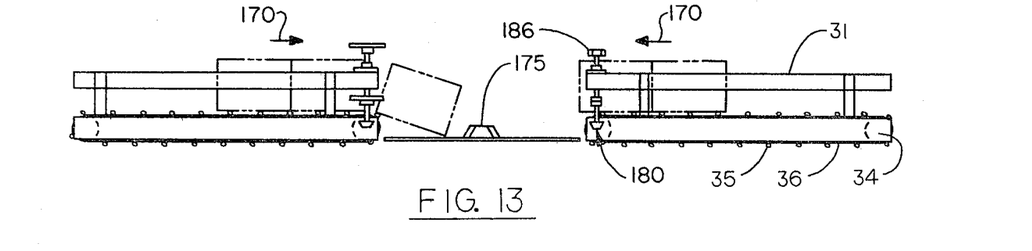
FIG. 13 is a front elevational view of the bale delivery and orienting portion with the bales oriented as shown in FIG. 12.
Figure 14:
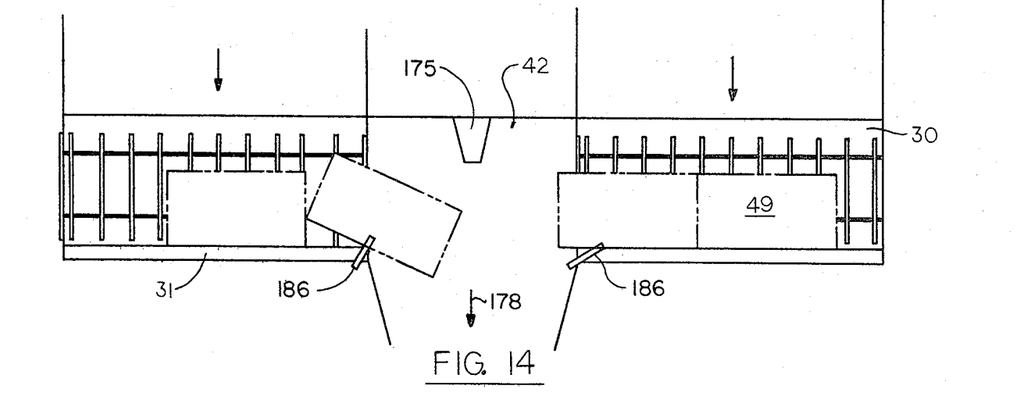
FIG. 14 is a partial plan view of the alternate preferred embodiment showing the bale delivery and orienting portion, handling the bales in a third condition.
Figure 15:
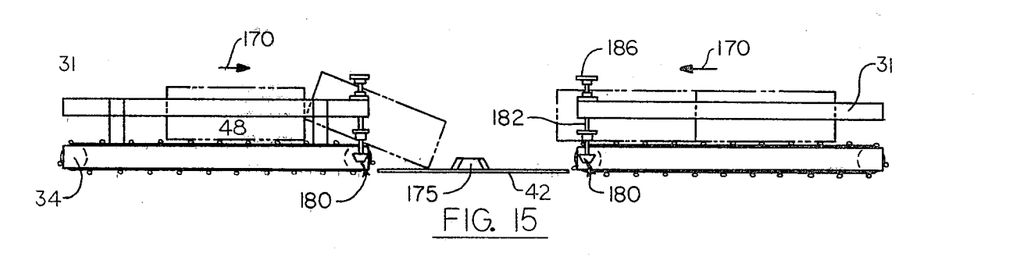
FIG. 15 is a front elevational view of the bale delivery and orienting portion with the bales oriented as shown in FIG. 14.
Figure 16:
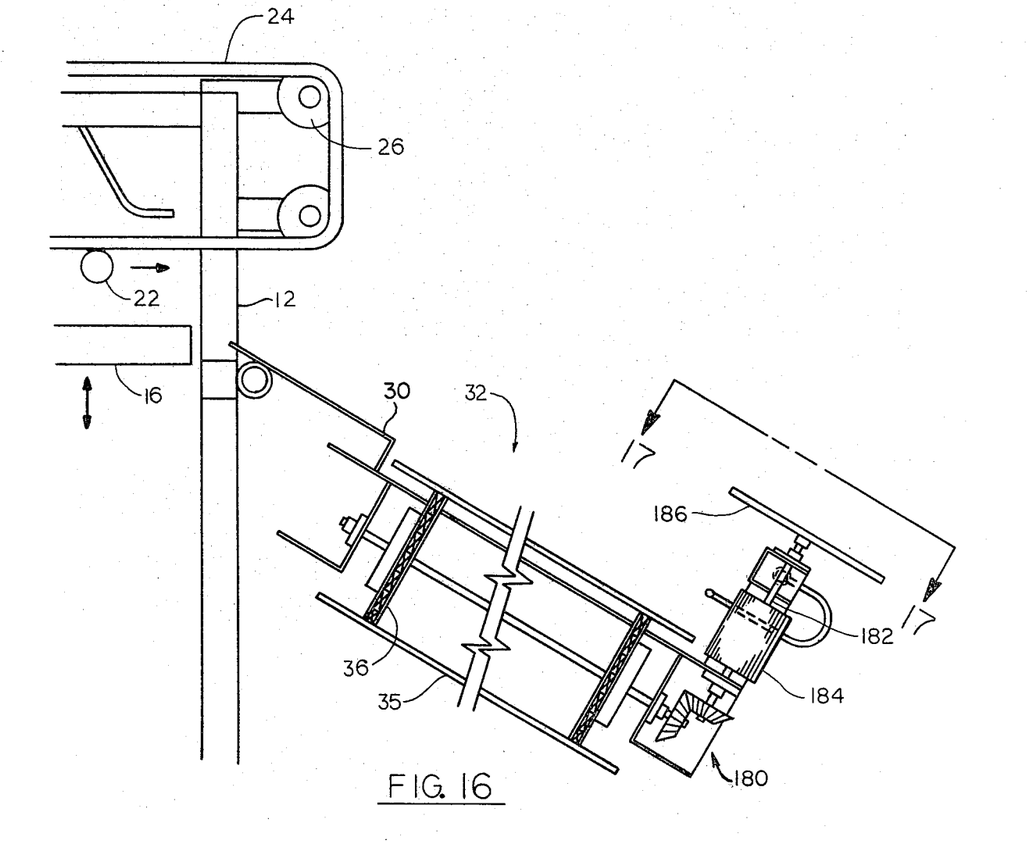
FIG. 16 is a partial sectional side view of one unit of the alternate preferred embodiment showing details of the transfer compartment and bale delivery mechanism.
Figure 17:
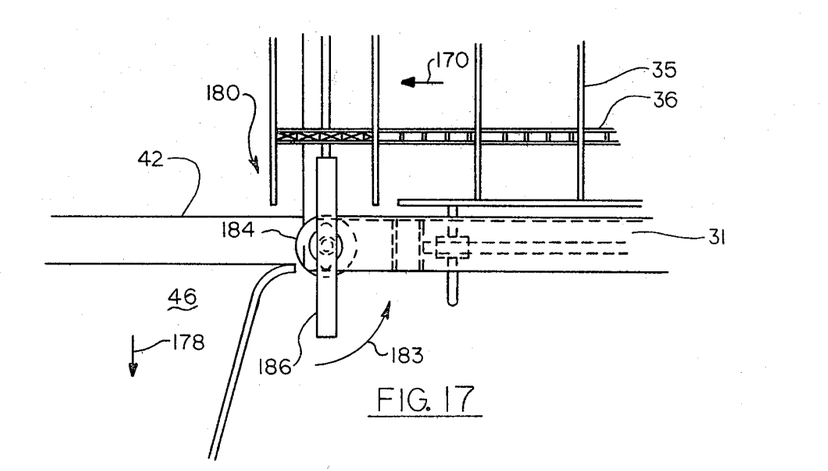
FIG. 17 is a partial plan view showing details of the transfer compartment and bale delivery mechanism taken along 17—17 in FIG. 16.

As best shown in FIG. 6 and 7, the drive system for the preferred embodiment includes a pump motor 90 which draws hydraulic fluid from a reservoir 92 through a filter 94 and delivers it to control valves 96 through a relief valve 98. The control valves 96 include a ram control valve 100 which supplies hydraulic fluid to the elevator ram 65 to raise and lower the elevator, a pusher control valve 102 which supplies hydraulic fluid to the pusher drive motor 28, and a conveyor control valve 104 which supplies hydraulic fluid to the transfer compartment conveyor drive motor 41. A flow control valve 105 is provided in fluid circuit of the transfer compartment conveyor drive motor 41 to permit manual regulation of the conveyor speed. To control the operation of the drive system I provide a control system 102 (See FIG. 6). The control system has a start-stop switch 112 which is mounted at a convenient place on the frame structure 11 for manual operation. The start-stop switch, when closed, delivers electricity to a control bus 114 to which several control subcircuits 116 are connected. The subcircuits 116 contain control elements, the operation of which can best be explained by describing an operating cycle of my destacker.

OPERATION

The operation of my preferred embodiment proceeds as follows. A cube of bales is placed in chamber 15 by a squeeze lift truck or other suitable means when the elevator 16 is in its lowest position adjacent the base 13 of the frame structure 12. The cube of bales is inserted from the rear of the frame structure through a stack receiving opening 118. (See FIG. 2). The elevator 16 is then raised until the top tier of bales on the cube stack reaches the top portion of the chamber 15 in position for engagement by one of the paddles 22 of the tier pusher 20. The raising of elevator 16 is initiated by closing the start-stop switch 112 which delivers power to the control bus 114, as indicated.

Electricity is then passed through the subcircuits 116 to activate the up solenoid 120 of the elevator ram control valve 100. For electricity to reach the up solenoid 120, certain circuit conditions must prevail. First, a pusher position switch 122 must be closed. This only occurs when one of the paddles 22 is at the beginning position for a push cycle aft of the upper tier of bales in the top of chamber 15. Thus, the pusher position switch 122 assures that paddles are out of the way of the new tier of bales being raised on the elevator into the top of chamber 15 before the elevator up solenoid can activate.

Next, a tier position wand switch 124 must be closed. This switch is located in the top of the chamber 15 near the forward portion and is closed until engaged by a tier of bales. When engaged by the presence of a tier of bales in the upper portion of chamber 15, the tier wand switch 124 is opened. Thus, the elevator up solenoid can only be activated when there are no more bales in the top of compartment 15.

When both of these conditions exist, that is, there are no bales in the top of compartment 15 and one of the pusher paddles 22 is in start position, an elevator control relay 126 is activated. This relay actuates a double throw switch which energizes the elevator up-down conduit 128 and the pusher control solenoid 130 through conduit 132 which controls the pusher control valve 102. Activation of the pusher control valve 102 shuts down the pusher motor 28, however, rather than activating it, since the pusher motor is arranged to operate except when the pusher control valve is energized and shuts it down.

When the elevator up-down conduit 128 is energized it activates either the up solenoid 120 or the down solenoid 134, depending on the condition of a direction control relay 136. The direction control relay 136 connects the up-down conduit 128 to the up solenoid 120 when de-energized, and when energized it connects the conduit to the down solenoid. Since the direction control solenoid is only energized when the elevator reaches the top of its travel and engages and closes a down elevator switch 138 in conduit 140 which is mounted on the structural frame 11, the up solenoid 120 will always be activated when the elevator is lower than its top point of travel. Thus, with the elevator at its lowest position, no bales in the top of chamber 15, and the pusher paddles positioned at start, the elevator up solenoid will activate the ram valve 100 to direct hydraulic fluid to the upside of the elevator ram 65.

When the elevator moves up enough to bring the bales in the top tier of the bale stack into contact with the tier position wand switch 124, the switch will open to de-energize the up solenoid 120 and stop the elevator's upward travel. At the same time, the pusher solenoid 130 will be deactivated and the pusher motor 28 will start and drive a pusher paddle 22 through the top of chamber 15, forcing a tier of bales out of the chamber and into the transfer compartment 29.

The contact of the bales in the transfer compartment with pusher stop switch 142, located on the floor of the compartment, will close the switch, and energize the pusher solenoid 130 to shut down the pusher motor 28. It is thus apparent that the stop switch 142 in the transfer compartment 29 is a control which is operatively associated with the support floor 30 and interconnected with the tier pushers 20 and which stops the tier pushers from delivering bales to the transfer compartment when a bale is in contact with the support floor. As long as bales remain in the transfer compartment 29, the pusher will remain deactivated. When the bales are all transferred to the orienting chute 42, the pusher will start again and operate until one of the paddles is back in start position. At that point, the tier position wand switch will be closed because of the lack of bales in the upper portion of chamber 15 and the pusher position switch 122 will be closed and the elevator control relay 126 will activate again, moving the elevator up one more tier.

The conveyor motor 41 in the transfer compartment 29 operates continuously except when bales back up on the floor 50 of the orienting chute 50. When this occurs, a chute switch 144 is actuated. Chute switch 144 is connected in the subcircuit 146 which feeds the conveyor motor solenoid 148. The conveyor motor solenoid 148, when deactivated, moves the conveyor motor control valve 104 to shut down the conveyor motor.

In FIGS. 8 through 17, inclusive, there is described an alternate preferred embodiment of this invention in which two bale destacking units are paired together with a common chute to form a dual destacker 150. For ease and clarity, those parts which are substantially the same as in the previous embodiment have been assigned the same numerals as in the description heretofore set forth and to other parts there have been assigned new numerals. The bale destacker unit 152 and 154 which makes up the dual destacker 150, are generally similar in construction to the base destacker 10 set forth in the first embodiment of the present invention but have a common orienting chute 156 and transfer compartments 158 and 160 which operate in opposite directions to deliver bales to the chute, thus the bale destacking unit 152 is referred to as a lefthand because it delivers bales to the left when viewed from its respective bale destack chamber 15, and unit 154 is a righthand unit since it passes bales to the right to the transfer compartment (viewed from its chamber 15).

Each of the bale destacking units 152 and 154 has a backup loading platform 162 which extends rearward from the stack receiving opening 118 in a unit frame structure 11. The platform 162 is coplanar with the elevator 16 when it is in its lowermost position, that is, its receiving position, and a hydraulically driven pusher bar 164 is provided on the platform 162 to push a stack of bales from the platform into the chamber 15. This permits a backup stack of bales 166 to be loaded on each of the backup load platforms 162 while the destacker unit 152 and 154 are still operating on the first stack, and then fed into the chamber when the elevator returns to receiving level.

It should be noted that, since the frame structure 11 and the elevator 16 associated with each of the chambers 15 of the destacker units 152 and 154 are, as before stated, generally similar in construction to the destacker 10 of the previously described embodiment, the destacker 10 may be provided with a backup platform and pusher bar similar in construction and mode of operation to the platform 162 and the pusher bar 164 of one of the units 152 or 154.

After a bale stack is loaded in each chamber 15 of the paired destacker units 152 and 154, the stacks are elevated one tier at a time to progressively expose the top tier of each stack to the tier pusher 20. Since destacker units are both feeding a common orienting chute, the matter of feeding bales to the chute must be coordinated.

As best seen in FIGS. 8 through 11, 16, and 17, each tier pusher 20 delivers bales to its associated transfer compartment 158 or 160 where the bales are received and supported by the wall 30 and floor 31. In each compartment, the bale is moved horizontally, as indicated by the arrows 170, toward the other of the transfer compartments by the drag chains 32 and over exit gates 172 individual to the compartments into the orienting chute 156 therebetween. The floor 50 of the chute is spaced below the walls 30 of the compartments and defines the down steps 47 individual to the exit gates. Th bales are delivered toward a deflector or orienter 175 which is an upward projection from the floor 50 and is disposed centrally between the compartments. The orienter has opposite, downwardly and outwardly facing planar sides 176 disposed individually toward the compartments. These sides are disposed in narrowing relation downwardly in the direction of the ramp 46 to deflect bales from the transfer compartments so that the bales move in a direction downwardly of the chute 156, as indicated by the arrow 178, in the same manner in which bales move from the transfer compartment 29 downwardly of the chute 46 of the previously described embodiment. It is apparent that the bales are thus deflected by the orienter into alignment with the ramp.

The sides 176 converge to a narrow downward end of the orienter. This end is spaced upwardly from the edge 57 a distance greater than half the length of the bales and less than their entire length. The relation of the height of the down step 47 to the length of the sides of the bales is the same as in the previous embodiment so that bales from the compartments 158 or 160 are oriented into a common position for movement in the direction 178 in substantially the same manner as bales are oriented into the common position in the chute 46 in the previously described embodiment. The attitude in which the bales are disposed as they move through the compartments 158 and 160 and the manner of orienting them into the common position in FIGS. 10 and 11 to the attitudes of the bales and the manner of orienting them in FIG. 5; such attitude and manner in FIGS. 12 and 13 correspond to those in FIG. 4; and such attitude and manner shown in FIGS. 14 and 15 correspond to those shown in FIG. 3.

Each transfer compartment 152 and 154 does not have a drag chain 33 for its support floor 31, but is provided with a drive mechanism, indicated generally by the numeral 180 and best shown in FIGS. 10, 11, 16, and 17, for driving the drag chains 32 of the compartment and for driving other elements now to be described. The mechanism is rotationally driven in any suitable manner as by a motor, not shown, similar to the motor 41 of the previously described embodiment. The mechanism has a shaft 182 rotatably mounted on and coplanar with the corresponding floor 31 and adjacent to the corresponding exit gate 172. The shafts are individually rotationally driven in the directions indicated by the arrows 183 in FIG. 10 and FIG. 17. Each shaft has a cylindrical roller 184 rotatably mounted thereon and disposed so that the periphery of the roller engages the bales as they move in the direction 170 and passes the bales through the exit gate. The mechanism has a paddle 186 mounted on the shaft upwardly of the roller and provided with a pair of arms extended in directions diametrically oppositely of the roller. The arms are spaced upwardly of the wall 30 a distance greater than the length of the narrower side 48 of a bale and less than the length of a wider side 49 thereof. The peripheral radius of the arms is greater than the peripheral radius of the roller so that the arms engage, as indicated by the numeral 188 in FIG. 10, a bale disposed with the wider side upright and thereby pass such bale onto the floor 50 with a tipping movement, as depicted to the left of the orienter 175 in FIG. 11, for proper engagement with the orienter for deflection thereby in the direction 178.

From this description of a preferred embodiment of my invention it should be understood that a stack of bales is disassembled into a chain of single like oriented bales substantially as follows. The stack is placed in the destacker, and elevated one tier at a time. Each top tier is, in order, forced off the stack into the transfer compartment 29 and dragged one by one to the orienting chute 42. In the orienting chute the bales are turned, flopped over and aligned as necessary to discharge them in line, end to end, on their wider sides. It will be appreciated, of course, that other final orientation of the bales could be selected if desired, and achieved by obvious modifications of my invention. Moreover, it will be understood that my invention can handle cartons and other rectangular and cube shaped objects as effectively as bales and may be made mobile or stationary.

Finally, it should be realized that my invention is fully capable of meeting the objects and providing the advantages heretofore attributed to it.

Having thus described but two embodiments of my invention it must be understood that many modifications may be made and still remain within the extent and scope of the present invention.

I claim:

1. An article destacking device for hexahedral articles having a pair of oppositely disposed, narrow sides, and a pair of oppositely disposed ends, comprising:
   a frame having means defining a chamber therein for receiving a stack of articles;
   an elevator mounted in said frame and disposed to move vertically in said chamber to elevate said stack in said frame in one tier steps;
   a tier pusher mounted in said frame and disposed to push articles on the top of said stack out of one side of said chamber;
   a transfer compartment disposed to receive articles pushed from the top of said chamber by said tier pusher, said transfer compartment being operatively associated with said frame and adjacent the side thereof from which said articles are pushed, said transfer compartment including a back wall and a floor wall with their adjacent edges joined in a generally right angular relationship and with each of said walls extending angularly upward to their terminal edges at an acute angle to a horizontal plane, thereby forming a generally V-shaped trough with an exit gate at one end thereof;
   article conveyance means operatively associated with said transfer compartment and operable to move articles deposited therein along a path of travel in said trough and through said exit gate; and
   article orienting means operatively associated with said transfer compartment and disposed to receive articles moved along said path of travel in said trough and through said exit gate and to individually orient said articles to a common position, said article orienting means including an inclined ramp with an upper portion and a lower portion, said upper portion having a floor disposed in a plane substantially parallel to the plane containing said back wall of said transfer compartment but positioned below said back wall plane to form a step at said exit gate of a height slightly greater than half of the narrow side width of said article, said upper portion further having a first upper deflecting wall extending generally vertically upward from said floor and disposed in spaced generally parallel relationship to said step at a distance slightly greater than the width of the wide side of said articles and extending from the top of said ramp upper portion downwardly parallel to said step at a point spaced above the plane of said floor wall a distance greater than the width of the wide side of said articles but substantially less than the length of said articles, and said upper portion further having a second upper deflecting wall extending generally vertically upward from said floor and disposed in spaced generally parallel relationship to said step at a distance greater than the length of said articles, and said lower portion of said ramp having a floor disposed at a substantially greater slope than said upper portion floor and joining said upper portion floor to form a tip edge extending laterally with respect to said ramp and spaced up said ramp a slight distance above the intersection with said ramp of a plane containing said floor wall of said compartment, said lower portion further having a first lower deflecting wall extending generally vertically upward from said lower portion floor on the side of said ramp adjacent said transfer compartment and in general alignment with said step at said exit gate, said first lower deflecting wall extending at its upper end to join said floor wall of said transfer compartment to form a turn edge along the end of said floor wall at said exit gate, said lower portion further having a second lower deflecting wall extending generally vertically upward from said lower portion floor on the side of said ramp remote from said transfer compartment, disposed in spaced parallel relationship to said first lower deflecting wall a distance slightly greater than the width of the wide side of said articles with its upper end spaced down said lower portion of said ramp from said tip edge a distance substantially equal to half the length of said articles, and said lower portion floor further having a third lower deflecting wall extending generally vertically upward from said lower portion floor on the side of said ramp remote from said transfer compartment, said third lower deflecting wall being disposed at an inwardly extending relationship with respect to the downward orientation of said lower portion and between said second upper deflecting wall and said second lower deflecting wall.

2. An article destacking device for hexahedral articles having a pair of oppositely disposed, narrow sides, and a pair of oppositely disposed ends, comprising:

a frame having means defining a chamber therein for receiving a stack of articles;

an elevator mounted in said frame and disposed to move vertically in said chamber to elevate said stack in said frame in one tier steps, said elevator including a platform suspended in said chamber in a generally horizontal attitude, a pair of tracks on one side of said frame adjacent said chamber, and plurality of trolley wheels movably mounting said trolley in said tracks for vertically reciprocal movement over a path of travel adjacent the upper portion of said chamber and substantially less than the height of said chamber, a plurality of trolley sheaves mounted on said trolley, and a plurality of second sheaves mounted on said frame below the path of travel of said trolley, and said plurality of cables include a pair of far cables disposed to pass from a far side of said platform on the opposite side of said frame from said tracks, over said first sheaves, under said second sheaves over said trolley sheaves and connect to said anchor points, and a pair of near cables disposed to pass from said near side of said platform adjacent said one side of said frame having said tracks thereon up over said trolley sheaves and down to connect to said anchor points, whereby vertical movement of said trolley of a particular distance in a particular direction along said path of travel moves said platform in said chamber in the same direction and twice the distance;

a tier pusher mounted in said frame and disposed to push articles on the top of said stack out of one side of said chamber;

a transfer compartment disposed to receive articles pushed from the top portion of said chamber by said tier pusher, said transfer compartment being operatively associated with said frame adjacent the side of said chamber from which said articles are pushed by said tier pusher, and having an exit gate;

article conveyance means disposed in said transfer compartment to move articles along a path of travel in said compartment and through said exit gates; and article orienting means operatively associated with said frame and disposed to receive articles moved along a path of travel in said trough and through said exit gate, and to individually orient said articles to a common position.

3. An article destacking device as described in claim 2, in which:

said tier pusher includes a pair of drag chains mounted in the upper portion of said frame in spaced parallel relationship on opposite sides of said chamber and disposed with an upper chain run above said chamber and a lower chain run passing along the sides of the upper portion of said chamber, a pair of pusher bars disposed between said drag chains with their ends attached to opposite drag chains, said pusher bars being attached to said drag chains in diametrically opposite positions whereby movement of said drag chains through half a cycle places the first of said pusher bars in the position occupied by the second of said pusher bars at the beginning of said cycle, and the first of said pusher bars passes through the upper portion of said chamber during a first half cycle of said drag chain and the second of said pusher bars passes through the upper portion of said chamber during the second half cycle, and drag chain means interconnected with said drag chains for moving said drag chains in unison.

4. An article destacking device for hexahedral articles having a pair of oppositely disposed first sides, a pair of oppositely disposed second sides, and a pair of oppositely disposed ends, comprising:

a frame having means defining a chamber therein for receiving a stack of articles;

an elevator mounted in said frame and disposed to move vertically in said chamber to elevate said stack in said frame in one tier steps;

a tier pusher mounted in said frame and disposed to push articles on the top of said stack out of one side of said chamber;

a transfer compartment disposed to receive articles pushed from the top portion of said chamber by said tier pusher, said transfer compartment being operatively associated with said frame and adjacent the side thereof from which said articles are pushed, said transfer compartment including an exit gate at one end thereof;

article conveyance means disposed in said transfer compartment and operable to move articles deposited therein along a path of travel through said exit gate: and article orienting means operatively associated with said frame and disposed to receive articles moved through said exit gate and to individually orient said articles to a common position, said article orienting means including an inclined ramp with an upper portion and a lower portion, whereby a tipping edge is formed at the junction therebetween, and said upper portion further includes a downward step at its junction with said exit gate of said transfer compartment, said step being extended across said exit gate and having a height slightly greater than half the width of one of the second sides of said articles, and said upper portion further having means defining a turning edge disposed generally vertically at the edge of said exit gate on the downward side of said ramp, and said upper portion further having a deflecting wall disposed opposite said exit gate and extending generally parallel thereto in spaced relationship therefrom a distance slightly greater than the width of one of the first sides of said article and extending down from the edge of said ramp upwardly with respect to said incline a distance substantially equal to the width of one of the first sides of said article.

5. An article destacking device as described in claim 4, in which:

said elevator includes a platform suspended in said chamber in a generally horizontal attitute, a trolley movably mounted in said frame adjacent said chamber for generally vertical reciprocal movement, a plurality of sheaves in the upper portion of said frame, a plurality of cables passing over said sheaves and having first ends interconnected with said trolley and hydraulic ram means interconnected between said frame and said trolley and operable to vertically reciprocate said trolley.

6. An article destacking device as described in claim 4, in which:

said tier pusher includes a pair of drag chains mounted in the upper portion of said frame and in spaced parallel relationship on opposite sides of said chamber and disposed with an upper chain run above said chamber and a lower chain run passing along the sides of the upper portion of said chamber, a pair of pusher bars disposed between said drag chains with their ends attached to opposite drag chains, said pusher bars being attached to said drag chains in diametrically opposite positions whereby movement of said drag chains through half a cycle places the first of said pusher bars in the position occupied by the second of said pusher bars at the beginning of said cycle, and the first of said pusher bars passes through the upper portion of said chamber during a first half cycle of said drag chains and the second of said pusher bars passes through the upper portion of said chamber during the second half cycle, and drag chain means interconnected with said drag chains for moving said drag chains in unison.

7. An article destacking device as described in claim 4, in which:

said transfer compartment article conveyance means includes a back wall drag chain mounted on said back wall and disposed to engage articles contacting said back wall and drag said articles through said exit gate, and a floor wall drag chain mounted on said floor wall and disposed to engage articles contacting said floor wall and drag said articles through said exit gate.

8. A device for destacking hexahedral articles such as bales and cartons selectively from a pair of generally cubical stacks comprising:

a frame having means defining a pair of chambers therein in side by side orientation, each chamber being disposed to receive a stack of said articles;

elevator means in each of said chambers, disposed to move vertically and elevate said stack therein in one tier steps;

tier pusher means in the upper portion of each of said chambers disposed to move horizontally across the top portion of said chamber to engage and push articles disposed in a tier in the top portion of said chamber laterally out of said chamber;

a pair of transfer compartments each disposed to receive articles pushed out of a different one of said chambers, said transfer compartments being operatively associated with said frame adjacent the top portion of said chambers on the side where said articles are pushed out of said chambers, said transfer compartments being laterally aligned and each being disposed to transfer articles received therein toward the other and each having an exit gate adjacent the other;

article orienting means operatively associated with said frame between said transfer compartments and disposed to receive articles passing through the exit gate of either of said transfer compartments and to individually orient said articles to a common position, said article orienting means having an orienting floor disposed below the support wall of each of said transfer compartments to define a down step at the exit gate of each of said transfer compartments, said down step having a height greater than half the narrow side width and less than half the wide side width of said articles, whereby articles passing from either of said transfer compartments through their respective exit gates and into said article orienting means oriented transversely to their path of travel lengthwise and with their narrow side supported by said support wall will be caused to tumble over said step and fall onto their wide side on said orienting floor; and transfer compartment drive means in each of said transfer compartments disposed to engage and move articles in either of said transfer compartments selectively into said article orienting means.

9. An article destacking device as described in claim 8, in which:

said article orienting means further includes a discharge ramp interconnected with said orienting floor in an alignment normal to the direction of travel of articles received by said article orienting means and disposed to discharge articles from said orienting floor and deflector means operatively associated with said orienting floor and disposed to deflect articles received by said article orienting means into alignment with said discharge ramp.

10. An article destacking device as described in claim 9 in which:

said deflector means of said article orienting means includes a projection disposed centrally of said orienting floor and spaced from said point of interconnection between said orienting floor and said discharge ramp a distance greater than half the length of said articles and less than their entire length, said projection having sides downwardly and outwardly and are oriented in a narrowing relationship in the direction of said discharge ramp.

11. An article destacking device as described in claim 8, in which:

said transfer compartments' drive means each further includes drag means disposed to engage and move said articles disposed in said transfer compartments, roller means having a roller rotatably mounted on a shaft co-planar with said support floor and adjacent said exit gate and disposed to engage and pass articles through said exit gate into said article orienting means, and paddle means mounted on said roller means shaft above said roller means and disposed to engage and pass articles through said exit gate into said article orienting means, said paddle means having a greater radius than said roller means.

12. An article destacking device as described in claim 8, in which:

each of said transfer compartments have a support wall extending downwardly and outwardly from the top portion of one of said chambers at the point of exit of articles therefrom to a distance greater than the length of said articles to a distal edge, and a support floor joined with said distal edge of said support wall and extending generally upwardly therefrom.

13. An article destacking device as described in claim 12, in which:

said support wall is disposed at an angle of substantially 45 degrees to the horizontal whereby articles received in said transfer compartment in groups from said chamber are separated from one another as they pass downwardly over said support wall into contact with said support floor, and said transfer compartments each have stop controls operatively associated with said support floor interconnected with said tier pushers in their respective chambers which stop said tier pushers from delivering more articles to said transfer compartment when any article is in contact with said support floor.

14. An article destacking device as described in claim 8, in which:
each of said chambers has a loading platform interconnected therewith and disposed to receive a stack of articles, said loading platform having stack transfer means operable to transfer stacks of articles from said loading Platforms into said chambers.

15. An article destacking device as described in claim 1, in which:
said frame includes a loading platform disposed adjacent said chamber for receiving a stack of articles thereon, said loading platform having stack transfer means operable to transfer said stack from said loading platform into said chamber.

* * * * *

UNITED STATES PATENT AND TRADEMARK OFFICE
CERTIFICATE OF CORRECTION

PATENT NO. : 4,302,141

DATED : November 24, 1981

INVENTOR(S) : Marvin E. Miguel

It is certified that error appears in the above-identified patent and that said Letters Patent are hereby corrected as shown below:

In the first line of the Abstract, change "Disclosed is a" to ---A---;

Column 1, line 17, delete "the" (first occurance);

Column 5, line 68, change "102" to ---110---;

Column 7, line 35, the second occurance of "50" change to ---42---;

Column 8, line 33, change "Th" to ---The---; and

Column 11, line 19, before "plurality" insert ---a---.

Signed and Sealed this

Sixteenth Day of February 1982

[SEAL]

Attest:

GERALD J. MOSSINGHOFF

Attesting Officer

Commissioner of Patents and Trademarks